(12) United States Patent
Shirokoshi et al.

(10) Patent No.: US 10,760,648 B2
(45) Date of Patent: Sep. 1, 2020

(54) PLANETARY GEAR DEVICE SERIES

(71) Applicant: Harmonic Drive Systems Inc., Shinagawa-ku, Tokyo (JP)

(72) Inventors: Norio Shirokoshi, Azumino (JP); Yasushi Ono, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 170 days.

(21) Appl. No.: 15/572,664

(22) PCT Filed: May 29, 2015

(86) PCT No.: PCT/JP2015/065628
§ 371 (c)(1),
(2) Date: Nov. 8, 2017

(87) PCT Pub. No.: WO2016/194065
PCT Pub. Date: Dec. 8, 2016

(65) Prior Publication Data
US 2018/0156313 A1   Jun. 7, 2018

(51) Int. Cl.
*F16H 57/033* (2012.01)
*F16H 1/28* (2006.01)
*F16H 1/32* (2006.01)

(52) U.S. Cl.
CPC ............ *F16H 1/28* (2013.01); *F16H 1/32* (2013.01); *F16H 57/033* (2013.01); *F16H 2057/0335* (2013.01)

(58) Field of Classification Search
CPC ... F16H 57/033; F16H 2057/0335; F16H 1/28
See application file for complete search history.

(56) References Cited

U.S. PATENT DOCUMENTS

2014/0371028 A1* 12/2014 Billmeyer ............... F16H 1/46
475/337

FOREIGN PATENT DOCUMENTS

| JP | 6-241282 A | 8/1994 |
|---|---|---|
| JP | 9-310737 A | 12/1997 |
| JP | 10-110793 A | 4/1998 |
| JP | 2007-64365 A | 3/2007 |
| JP | 2008-89126 A | 4/2008 |
| JP | 2011-52788 A | 3/2011 |
| JP | 2014-145433 A | 8/2014 |

OTHER PUBLICATIONS

International Search Report (PCT/ISA/210) dated Sep. 1, 2015, by the Japanese Patent Office as the International Searching Authority for International Application No. PCT/JP2015/065628.

* cited by examiner

*Primary Examiner* — Erin D Bishop
(74) *Attorney, Agent, or Firm* — Buchanan Ingersoll & Rooney PC

(57) ABSTRACT

In a planetary gear device series composed of eight kinds of planetary gear devices with gear reduction ratios of 3 to 10, the planetary gear device of each gear reduction ratio uses an internal gear with 108 teeth or a slightly different number of teeth, and the module is common among the planetary gear devices of all gear reduction ratios. The combinations of the sun gear teeth number Za and the internal gear teeth number Zc in the planetary gear device of each reduction ratio are given in Table 1 of this application.

2 Claims, 1 Drawing Sheet

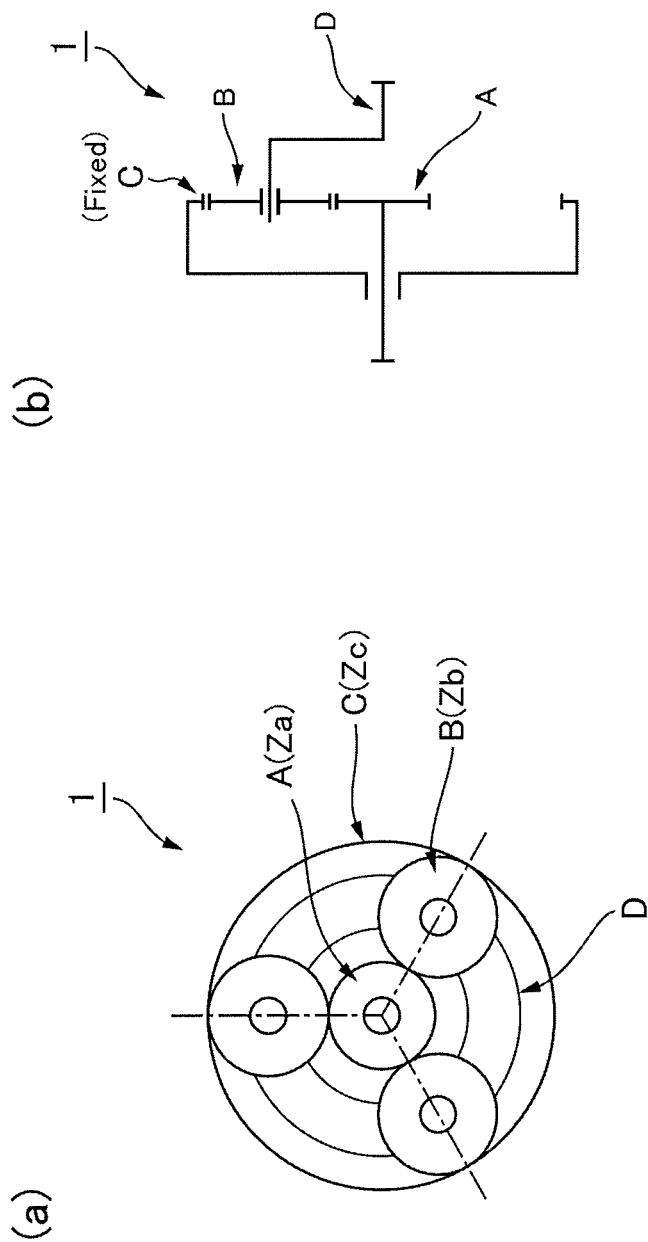

PLANETARY GEAR DEVICE SERIES

TECHNICAL FIELD

The present invention relates to a planetary gear device series provided with planetary gear devices having differing gear reduction ratios.

BACKGROUND ART

As is well-known, planetary gear devices comprise a sun gear, an internal gear disposed concentrically around the sun gear, planet gears that mesh with the sun gear and the internal gear, and a planet carrier for rotatably supporting the planet gears. In a typical planetary-type planetary gear reducer, the sun gear is an input shaft, the internal gear is fixed, and the planet carrier is an output shaft.

In order to respond to demand in markets in which there is a need for reducers having various gear reduction ratios according to the intended use, planetary gear device manufacturers provide a series of planetary gear devices that comprise differing gear reduction ratios and have the same structure. It is necessary to separately design the module, number of teeth, and other such features of the constituent gears for each gear reduction ratio in order to satisfy the criteria for establishing a planetary gear mechanism. Even with planetary gear devices within the same series, differences in the gear reduction ratios ordinarily give rise to variation in the specifications of the constituent gears; therefore, it is necessary to prepare constituent components for each gear reduction ratio.

In the series disclosed in Patent Document 1 comprising a simple planetary gear reducer having differing gear reduction ratios, a crank part is provided to a planet shaft of the planet carrier, whereby the components of the planet carrier, etc., can be made the same. In the series disclosed in Patent Document 2 comprising a simple planetary gear reducer having differing gear reduction ratios, a configuration is employed in which the position of the planet shaft of the planet carrier can be changed in accordance with the gear reduction ratio, and the components of the internal gear, etc., can be made the same.

PRIOR ART DOCUMENT

Patent Documents

Patent Document 1: JP-A 2007-64365
Patent Document 2: JP-A 2011-52788

SUMMARY OF THE INVENTION

Problems to be Solved by the Invention

When configuring a series that includes planetary gear devices having a wide variety of gear reduction ratios, it is necessary to produce gears having modules and numbers of teeth that correspond to each gear reduction ratio. As described in Patent Documents 1 and 2, achieving this correspondence merely by adjusting the position of a planet shaft poses many difficulties. Therefore, in constructing a series that includes planetary gear devices having differing reduction ratios, there remains a problem in regard to an increase in the types of tools for use in gear cutting processes, the number of management man-hours, the types of components, and the manufacturing costs.

In order to minimize fluctuation in the device dimensions, particularly fluctuations in the outer diameter, when creating a series of planetary gear devices, it is desirable, where possible, to enable the same internal gears in planetary gear devices of each gear reduction ratio included in the series. It is also desirable to enable the module to be the same among planetary gear devices of each gear reduction ratio so as to make it possible to reduce the types of tools for use in gear cutting processes.

In view of these circumstances, an object of the present invention is to provide a planetary gear device series in which the same components are used among planetary gear devices having differing gear reduction ratios.

Means of Solving the Problems

In order to solve the abovementioned problem, according to the present invention, a planetary gear device series including a plurality of types of planetary gear devices having differing gear ratios is characterized in that:

eight types of planetary gear devices having gear reduction ratios of 3-10 are included as the planetary gear devices;

a normal module is the same among the planetary gear devices; and in the planetary gear devices of each gear reduction ratio, the number of teeth Za of a sun gear and the number of teeth Zc of an internal gear are set to the values shown in table 1.

The numbers of teeth in the sun gear and internal gear of the planetary gear devices of each gear reduction ratio may, in a uniform manner, be integral multiples of the numbers shown in table 1.

TABLE 1

| | Gear reduction ratio R | | | | | | | |
|---|---|---|---|---|---|---|---|---|
| | 3 | 4 | 5 | 6 | 7 | 8 | 9 | 10 |
| Number Za of teeth of sun gear | 54 | 36 | 27 | 21 | 18 | 15 | 13 | 12 |
| Number Zc of teeth of internal gear | 108 | 108 | 108 | 105 | 108 | 105 | 104 | 108 |

In the present invention, in a series including planetary gear devices having gear reduction ratios of 3-10, a design is adopted such that the number of teeth of each of the gears constituting part of the planetary gear devices of each gear reduction ratio is such that an internal gear having 108 teeth, which in general is widely encountered number in planetary gear reducers, can be the same to the extent possible among the planetary gear devices of each gear reduction ratio, and such that all of the modules (normal modules) of the gears constituting part of the planetary gear devices of each gear reduction ratio can be made the same.

According to the present invention, it is possible to use the same internal gears having 108 teeth at gear reduction ratios of 3, 4, 5, 7, and 10, and it is possible to use an internal gear having a number of teeth slightly different from 108 at the other gear reduction ratios. Specifically, it is possible to: use three types of internal gears, having 108, 105, and 104 teeth, as the types of internal gears to be used; and produce eight types of planetary gear devices that have gear reduction ratios of 3-10 and that are included in the series. Accordingly, fluctuations in the outer diameter of the planetary gear devices of each gear reduction ratio can be minimized.

Additionally, because all of the modules of the gears used in the planetary gear devices of each gear reduction ratio included in the series are consistent, the types of tools for use in gear cutting processes can be reduced and tool costs, etc., can be greatly reduced.

BRIEF DESCRIPTION OF THE DRAWINGS

FIG. 1 is a structural diagram and a schematic diagram of a planetary gear device to which the present invention can be applied.

MODE FOR CARRYING OUT THE INVENTION

Embodiments of a planetary gear device series having differing gear reduction ratios to which the present invention is applied are described below with reference to the drawings.

FIG. 1(a) is a structural diagram of a planetary gear device constituting part of a planetary gear device series according to the present embodiment, and FIG. 1(b) is a schematic diagram of the same. The planetary gear device 1 has a sun gear A, an internal gear C disposed concentrically around the sun gear A, planet gears B that mesh with the sun gear A and the internal gear C, and a planet carrier D provided with planet shafts for rotatably supporting the planet gears B. In the present example, three planet gears B are disposed at equiangular intervals. Additionally, spur gears or helical gears are used as the gears A, B, C.

The planetary gear device 1 is a planetary-type gear reducer, where the sun gear A is an input shaft, the internal gear C is fixed, and the planet carrier D is an output shaft. As is well known, the gear reduction ratio R is represented by the following formula, where Za is the number of teeth of the sun gear A, Zb is the number of teeth of the planet gears B, and Zc is the number of teeth of the internal gear C.

$$R=(Zc/Za)+1$$

A planetary gear device series having differing gear reduction ratios is constructed from eight types of planetary gear devices having gear reduction ratios of 3-10, these eight types of planetary gear devices being planetary gear devices 1 configured as described above. Planetary gear devices having other gear reduction ratios can also be included.

In the series constructed from eight types of planetary gear devices 1 having gear reduction ratios of 3-10, the inventors focused on using an internal gear having 108 teeth as the internal gear C to the extent possible, and employing a configuration in which all of the modules (normal modules) of the gears in the planetary gear devices 1 were the same. The numbers of teeth of the gears of the planetary gear devices 1 of each gear reduction ratio were designed on this basis. A planetary gear device series in which the number of teeth, etc., of the planetary gear devices of each gear reduction ratio were set as in table 2 was thereby obtained. Table 2 shows a scenario in which helical gears having a helix angle of 10° are used as the gears, the normal module is 1.0 mm, equiangular-disposition design of three planet gears B is employed, and the pressure angle of the teeth is 20°.

TABLE 2

| Gear reduction ratio R | Normal module (mn) mm | Number of teeth | | | Intercentral distance Between sun and planet gears; between planet and internal gears mm |
|---|---|---|---|---|---|
| | | Sun gear Za | Planet gear Zb | Internal gear Zc | |
| 3 | 1.0 | 54 | 27 | 108 | 41.2 |
| 4 | 1.0 | 36 | 36 | 108 | 36.8 |
| 5 | 1.0 | 27 | 40 | 108 | 34.4 |
| 6 | 1.0 | 21 | 42 | 105 | 32.3 |
| 7 | 1.0 | 18 | 45 | 108 | 32.3 |
| 8 | 1.0 | 15 | 45 | 105 | 30.8 |
| 9 | 1.0 | 13 | 45 | 104 | 30.1 |
| 10 | 1.0 | 12 | 48 | 108 | 30.8 |

As shall be apparent from table 2, the modules of the gears constituting part of the planetary gear devices of each gear reduction ratio are the same. Therefore, the types of tools for use in gear cutting processes can be reduced, facilitating tool management, and the tool cost can also be reduced.

As the internal gear C, a common internal gear having 108 teeth is used in planetary gear devices having gear reduction ratios R of 3, 4, 5, 7, and 10, a common internal gear having 105 teeth is used in planetary gear devices having gear reduction ratios R of 6 and 8, and an internal gear having 104 teeth is used in an planetary gear device having a gear reduction ratio R of 9. Accordingly, just three types of internal gear may be prepared for the eight types of planetary gear devices. Because the difference in the numbers of teeth of the internal gears C is very small, variation in the outer diameters of the devices among the planetary gear devices included in the series can also be minimized.

As pertains to the distance between centers of the constituent gears in the planetary gear devices of each gear reduction ratio, the planetary gear devices having gear reduction ratios of 6 and 7 have intercentral distances of 32.3 mm, and the planetary gear devices having gear reduction ratios of 8 and 10 have intercentral distances of 30.8 mm. Among the planetary gear devices having the same intercentral distances, it is possible to use the same planet carriers provided with planet shafts for supporting the planet gears.

Furthermore, the planet gears among the planetary gear devices having gear reduction ratios of 7, 8, and 9 can be the same.

As described above, setting the series configured from the eight types of planetary gear devices having gear reduction ratios of 3-10 such that the gears are as shown in table 2 makes it possible to use the same gear cutting tools among the planetary gear devices of each gear reduction ratio. It is also possible to use the same internal gears, planet carriers, and planet gears among the planetary gear devices for some of the gear reduction ratios. Accordingly, the types of tools and the overall cost of tool management and stock management can be reduced. The types of gears for constituting the series and the manufacturing cost can also be reduced.

Other Embodiments

It is possible to similarly construct a series of eight types of planetary gear devices having gear reduction ratios of 3-10 such that the numbers of teeth of the gears constituting the planetary gear devices of each gear reduction ratio shown in table 2 are modified, in a uniform manner, to integral multiples thereof. Additionally, employing a dislocated tooth profile makes it possible to increase or decrease the number of teeth of the planet gears by 1. The intercentral distances also increase or decrease from the values shown in table 2 in accordance with this modification.

Cases where numbers of teeth that are modified in a uniform manner to integral multiples of the numbers of teeth shown in table 2 are used, and cases where planet gears in which the number of teeth shown in table 2 is increased or decreased through use of a dislocated tooth profile are used, are also included in the scope of the present invention. In these cases as well, the same operation and effect is achieved as in the case of an planetary gear device series configured on the basis of the designs shown in table 2.

The invention claimed is:

1. A planetary gear device assembly configured to selectively make a plurality of types of planetary gear devices having differing gear reduction ratios R of 3, 4, 5, 6, 7, 8, 9, and 10, the planetary gear device assembly comprising:
a plurality of sun gears, three internal gears, and a plurality of planetary gears,
wherein each of the plurality of gears comprises a normal module, wherein the normal module is the same among the plurality of sun gears, internal gears, and planetary gears, and wherein, each of the planetary gear devices is made from at least one of the plurality of sun gears, at least one of the plurality of planetary gears, and at least one of the three internal gears, and in each of the planetary gear devices a number of teeth $Z_a$ of the at least one sun gear and a number of teeth $Z_c$ of the at least one internal gear are set to the following values:
R 3, Za 54, Zc 108;
R 4, Za 36, Zc 108;
R 5, Za 27, Zc 108;
R 6, Za 21, Zc 105;
R 7, Za 18, Zc 108;
R 8, Za 15, Zc 105;
R 9, Za 13, Zc 104; and
R 10, Za 12, Zc 108.

2. The planetary gear device assembly according to claim 1, wherein, in each of the planetary gear devices having R of 3, 4, 5, 6, 7, 8, 9, and 10, the normal module, a number of teeth $Z_b$ of the at least one planetary gear, and an intercentral distance between the at least one sun gear and the at least one planetary gear are set to the following values:
R 3, normal module 1.0 mm, Zb 27, intercentral distance 41.2 mm;
R 4, normal module 1.0 mm, Zb 36, intercentral distance 36.8 mm;
R 5, normal module 1.0 mm, Zb 40, intercentral distance 34.4 mm;
R 6, normal module 1.0 mm, Zb 42, intercentral distance 32.3 mm;
R 7, normal module 1.0 mm, Zb 45, intercentral distance 32.3 mm;
R 8, normal module 1.0 mm, Zb 45, intercentral distance 30.8 mm;
R 9, normal module 1.0 mm, Zb 45, intercentral distance 30.1 mm; and
R 10, normal module 1.0 mm, Zb 48, intercentral distance 30.8 mm.

* * * * *